United States Patent [19]

Adam et al.

[11] Patent Number: 5,424,405
[45] Date of Patent: Jun. 13, 1995

[54] FIBER-REACTIVE MONOAZO DYES HAVING A 2-VINYLSULFONYL-5-HALOACRYLOYLANILINE DIAZO COMPONENT OR THE LIKE

[75] Inventors: Jean-Marie Adam, Rosenau, France; Guido Jordine, Freiburg, Germany

[73] Assignee: Ciba-Geigy Corporation, Ardsley, N.Y.

[21] Appl. No.: 154,772

[22] Filed: Nov. 19, 1993

[30] Foreign Application Priority Data

Nov. 23, 1992 [CA] Canada ............... 3590/92-6

[51] Int. Cl.$^6$ .................. C09B 62/507; C09B 62/47; D06P 1/384
[52] U.S. Cl. .................. 534/642; 534/643; 558/33; 564/207; 564/214
[58] Field of Search .......... 534/642, 643; 558/33; 564/207, 214

[56] References Cited

U.S. PATENT DOCUMENTS

| | | | |
|---|---|---|---|
| 4,560,388 | 12/1985 | Rohrer | 534/642 X |
| 4,703,112 | 10/1987 | Mischke | 534/642 |
| 4,885,360 | 12/1989 | Scheibli | 534/642 |
| 4,897,469 | 1/1990 | Eilingsfeld et al. | 534/605 |
| 4,917,705 | 4/1990 | Mausezahl et al. | 534/643 X |

FOREIGN PATENT DOCUMENTS 0073481  3/1983  European Pat. Off.
0559617  9/1993  European Pat. Off.

*Primary Examiner*—Mary C. Lee
*Assistant Examiner*—Fiona Powers
*Attorney, Agent, or Firm*—Kevin T. Mansfield

[57] ABSTRACT

The fibre-reactive dyes of the formula

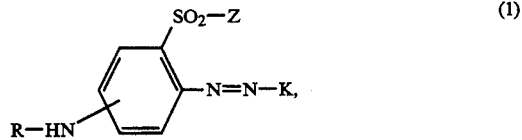

where the variables are each as defined in the claims, are suitable in particular for dyeing nitrogen-containing and hydroxyl-containing fibre materials.

9 Claims, No Drawings

FIBER-REACTIVE MONOAZO DYES HAVING A2-VINYLSULFONYL-5-HALOACRYLOYLANILINE DIAZO COMPONENT OR THE LIKE

The present invention relates to fibre-reactive dyes, to the preparation thereof and to the use thereof for dyeing fibre materials from an aqueous bath or for printing fibre materials.

The present invention accordingly provides compounds of the formula

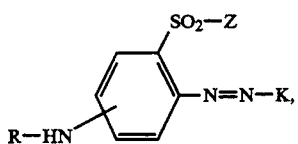

where
K is the radical of a coupling component of the benzene or naphthalene series or the heterocyclic series,
R is a radical —C(O)—CH$_2$—X, —C(O)—C(X)=CH$_2$, —C(O)—CH(X)—CH$_2$—X, —C(O)—CH=CH$_2$ or —C(O)—C(CH$_3$)=CH$_2$,
X is halogen,
Z is vinyl or a radical —CH$_2$CH$_2$—Y, and
Y is —OSO$_3$H, —SSO$_3$H, —OPO(OH)$_2$, —O-COCH$_3$, —Cl or a radical of the formula

where the ring A may be substituted by carboxyl or carbamoyl and An$^\ominus$ is an anion.

The coupling components K-H underlying the compounds of the formula (1) are known per se and have been plentifully described, for example in Venkataraman The Chemistry of Synthetic Dyes, Volume 6, pages 213-297, Academic Press, New York, London 1972.

K is preferably the radical of a benzene, naphthalene, pyrazolone, aminopyrazole, pyridone, pyrimidine, indole, naphthylimidazole, diphenylamine, pyrazolo[2.3-a]pyrimidine, tetrahydroquinoline or acetoacetamide coupling component, all of which can be further substituted.

Suitable substituents for K include for example C$_1$-C$_6$alkyl such as methyl, ethyl, n- or isopropyl, n-butyl, isobutyl, sec-butyl, tert-butyl or straight-chain or branched pentyl or hexyl; C$_1$-C$_4$alkoxy, generally to be understood as meaning methoxy, ethoxy, n-propoxy, isopropoxy, n-butoxy, isobutoxy, sec-butoxy or tert-butoxy; phenoxy; unsubstituted or hydroxyl-substituted C$_2$-C$_6$alkanoylamino, e.g. acetylamino, hydroxyacetylamino or propionylamino; benzoylamino; amino; N—C$_1$-C$_4$alkyl- or N,N-di-C$_1$-C$_4$alkyl-amino, which may be substituted, for example by hydroxyl, C$_1$-C$_4$alkoxy, carboxyl, cyano, halogen, sulfo, sulfato, phenyl or sulfophenyl, in the alkyl moiety, e.g. methylamino, ethylamino, N,N-dimethylamino, N,N-diethylamino, cyanoethylamino, hydroxyethylamino, N,N-dihydroxyethylamino, sulfoethylamino, 3-sulfo-n-propylamino, sulfatoethylamino, N-ethyl-N-(3-sulfobenzyl)amino or N-(3-sulfoethyl)-N-benzylamino; cyclohexylamino; N-phenyl- or N-C$_1$-C$_4$alkyl-N-phenyl-amino which may be substituted by C$_1$-C$_4$alkyl, C$_1$-C$_4$alkoxy, halogen or sulfo in the phenyl moiety; C$_2$-C$_4$alkoxycarbonyl, e.g. methoxy- or ethoxy-carbonyl; trifluoromethyl; nitro; cyano; halogen, such as fluorine, bromine and in particular chlorine; ureido; hydroxyl; carboxyl; sulfo; sulfomethyl; carbamoyl; sulfamoyl; N-phenyl- or N—C$_1$-C$_4$alkyl-N-phenylsulfamoyl, which may be substituted by sulfo or carboxyl in the phenyl moiety, e.g. N-(3-sulfophenyl)sulfamoyl, N-(2-carboxyphenyl)sulfamoyl, N-methyl- or N-ethyl-N-phenyl-sulfamoyl or N-methyl- or N-ethyl-N-(3-sulfophenyl)sulfamoyl; methylsulfonyl; a reactive radical —NHR or —NH—C(O)—C$_6$H$_5$—R, where R in each case is as defined above; and unsubstituted or for example C$_1$-C$_4$alkyl-, C$_1$-C$_4$alkoxy-, halogen-, sulfo-, amino-, N—C$_1$-C$_4$alkyl- or N,N-di-C$_1$-C$_4$alkyl-amino- or phenylamino-substituted phenylazo or naphthylazo.

Preferred meanings of K are: a phenyl or naphthyl radical which carries one or more substitutents selected from the group consisting of hydroxyl, C$_1$-C$_4$alkoxy, amino, N—C$_1$-C$_4$alkyl- or N,N-di-C$_1$-C$_4$alkyl-amino, acetylamino, benzoylamino, C$_1$-C$_4$alkyl, N-phenyl- or N—C$_1$-C$_4$alkyl-N-phenyl-sulfamoyl which may be substituted by carboxyl or sulfo in the phenyl moiety, unsubstituted or sulfo-substituted N—C$_1$-C$_4$alkyl-N-benzylamino, unsubstituted or for example C$_1$-C$_4$alkyl-, C$_1$-C$_4$alkoxy-, halogen-, sulfo-, amino-, N—C$_1$-C$_4$alkyl- or N,N-di-C$_1$-C$_4$alkyl-amino- or phenylamino-substituted phenylazo or naphthylazo and a reactive radical —NHR or —NH—C(O)—C$_6$H$_5$—R, where R is in each case as defined in claim 1; an unsubstituted or C$_1$-C$_4$alkyl-, C$_1$-C$_4$alkoxy-, sulfo- and/or halogen-substituted 1-phenylpyrazol-5-one or 1-phenyl-5-aminopyrazole radical; an unsubstituted or C$_1$-C$_4$alkyl-, C$_1$-C$_4$alkoxy-, sulfo- and/or halogen-substituted indole radical; or a naphthylimidazole radical which is unsubstituted or substituted by C$_1$-C$_6$alkyl, sulfo, hydroxyl or phenylamino, which in turn can be substituted by C$_1$-C$_4$alkyl, C$_1$-C$_4$alkoxy, halogen or sulfo.

Halogen X is preferably bromine or chlorine and particularly preferably bromine.

Preferred R is acryloyl; methacryloyl; chloroacetyl; bromoacetyl; α-chlor- or α-bromoacryloyl, i.e. a radical of the formula —C(O)—CCl=CH$_2$ or —C(O)—CBr=CH$_2$; or α,β-dichloro- or αβ-dibromopropionyl, i.e. a radical of the formula —C(O)—CHCl—CH$_2$Cl or —C(O)—CHBr—CH$_2$Br.

R is particularly preferably α-bromoacryloyl or α,β-dibromopropionyl.

In a Y of the formula (2) the pyridinium cation is preferably the 4-carboxy- or 4-carbamoyl-pyridinium cation. The anion An$^\ominus$ can be any customary anion, for example the chloride ion.

Y is preferably the radical —OSO$_3$H, —SSO$_3$H or —OPO(OH)$_2$ and particularly preferably the radical —OSO$_3$H.

Accordingly, Z is preferably vinyl, β-sulfatoethyl, β-thiosulfatoethyl or β-phosphatoethyl and particularly preferably vinyl or β-sulfatoethyl.

The compounds of the formula (1) have for example 1 to 3, preferably 2 or 3 and particularly preferably 2 water-solubilizing groups. The preferred solubilizing groups are the sulfo and sulfato groups; the term sulfo is used here and comprehends not only the free acid but also preferably its salt. Suitable salts include for example alkali metal, alkaline earth metal or ammonium salts or the salts of organic amines, e.g. sodium, potassium, lithium or ammonium salts or the salt of triethanolamine.

A preferred embodiment of the present invention relates to compounds of the formula (1) where K carries one or two sulfo groups and may be further substituted by other radicals and Z is β-sulfatoethyl. A further preferred embodiment of the present invention relates to compounds of the aforementioned formula (1) where K is the radical of a benzene, naphthalene, pyrazolone, aminopyrazole, pyridone, pyrimidine, indole, naphthylimidazole, diphenylamine, pyrazolo[2.3-a]pyrimidine, tetrahydroquinoline or acetoacetamide coupling component, which is either unsubstituted or substituted by $C_1$–$C_6$alkyl, $C_1$–$C_4$alkoxy, phenoxy, unsubstituted or hydroxyl-substituted $C_2$–$C_6$alkanoylamino, benzoylamino, amino, N—$C_1$–$C_4$alkyl- or N,N-di-$C_1$–$C_4$alkyl-amino which may be substituted by hydroxyl, $C_1$–$C_4$alkoxy, carboxyl, cyano, halogen, sulfo, sulfato, phenyl or sulfophenyl in the alkyl moiety, cyclohexylamino, N-phenyl- or N—$C_1$–$C_4$alkyl-N-phenyl-amino which may be substituted by $C_1$–$C_4$alkyl, $C_1$–$C_4$alkoxy, halogen or sulfo in the phenyl moiety, $C_2$–$C_4$alkoxycarbonyl, trifluoromethyl, nitro, cyano, halogen, ureido, hydroxyl, carboxyl, sulfo, sulfomethyl, carbamoyl, sulfamoyl, N-phenyl- or N—$C_1$–$C_4$alkyl-N-phenyl-sulfamoyl, which may be substituted by sulfo or carboxyl in the phenyl moiety, methylsulfonyl, a reactive radical —NHR or —NH—C(O)—$C_6H_5$—R, and/or by unsubstituted or $C_1$–$C_4$alkyl-, $C_1$–$C_4$alkoxy-, halogen-, sulfo-, amino-, N—$C_1$–$C_4$alkyl- or N,N-di-$C_1$–$C_4$alkylamino- or phenylamino-substituted phenylazo or naphthylazo, R is acryloyl, methacryloyl, chloroacetyl, bromoacetyl, α-chloro- or α-bromo-acryloyl or α,β-dichloro- or α,β-dibromo-propionyl, and Z is vinyl, β-sulfatoethyl, β-thiosulfatoethyl or β-phosphatoethyl.

A particularly preferred embodiment of the present invention relates to compounds of the formula

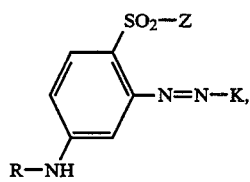

where K, R and Z are each subject to the aforementioned definitions and statements of preference.

A particularly preferred embodiment of the present invention relates to compounds of the abovementioned formula (1a) where K is a phenyl or naphthyl radical which carries one or more substitutents selected from the group consisting of hydroxyl, $C_1$–$C_4$alkoxy, amino, N—$C_1$–$C_4$alkyl- or N,N-di-$C_1$–$C_4$alkyl-amino, acetylamino, benzoylamino, $C_1$–$C_4$alkyl, N-phenyl- or N—$C_1$–$C_4$alkyl-N-phenyl-sulfamoyl which may be substituted by carboxyl or sulfo in the phenyl moiety, unsubstituted or sulfo-substituted N—$C_1$–$C_4$alkyl-N-benzylamino, unsubstituted or $C_1$–$C_4$alkyl-, $C_1$–$C_4$alkoxy-, halogen-, sulfo-, amino-, N—$C_1$–$C_4$alkyl- or N,N-di-$C_1$–$C_4$alkylamino- or phenylamino-substituted phenylazo or naphthylazo and a reactive radical —NHR or —NH—C(O)—$C_6H_5$—R; an unsubstituted or $C_1$–$C_4$alkyl-, $C_1$–$C_4$alkoxy-, sulfo- and/or halogen-substituted 1-phenyl-pyrazol-5-one or 1-phenyl-5-aminopyrazole radical; an unsubstituted or $C_1$–$C_4$alkyl-, $C_1$–$C_4$alkoxy-, sulfo- and/or halogen-substituted indole radical; or a naphthylimidazole radical which is unsubstituted or substituted by $C_1$–$C_6$alkyl, sulfo, hydroxyl and/or phenylamino, which in turn can be substituted by $C_1$–$C_4$alkyl, $C_1$–$C_4$alkoxy, halogen or sulfo, R is α-bromoacryloyl or α,β-dibromopropionyl, and Z is vinyl or β-sulfatoethyl.

The compounds of the formulae (1) and (1 a) can be obtained in a manner known per se, for example by diazotizing a compound of the formula

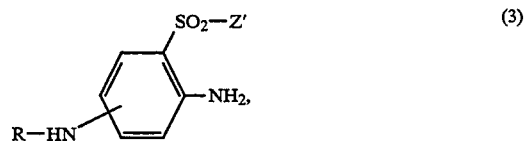

where R is as defined above and Z' independently has the meaning assigned above to Z or is 2-hydroxyethyl, coupling the resulting diazonium compound with a coupling component of the formula

where K is as defined above, and if necessary converting the radical —$SO_2Z'$ into any desired radical —$SO_2Z$.

The compounds of the formulae

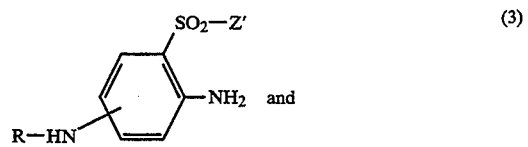

and

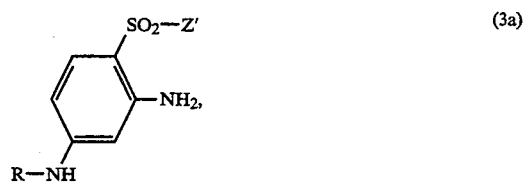

where R and Z' are each subject to the aforementioned definitions and statements of preference, are novel and also form part of the subject-matter of the invention. They can be prepared for example by reacting a compound of the formula

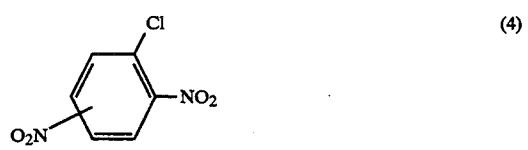

with 2-mercaptoethanol, oxidizing the resulting compound to form the sulfonyl compound of the formula

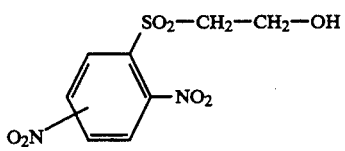

introducing a suitable leaving group Z, reducing the two nitro groups to amino groups, and finally acylating one of the amino groups selectively with a compound of the formula R—Hal  (4b), where Hal is halogen, preferably chlorine, and R is as defined above.

The reaction of the known compounds of the formula (4) with 2-mercaptoethanol is carried out for example in a suitable solvent in the presence of potassium fluoride at elevated temperature, for example at 50° -100° C. Examples of suitable solvents include water, lower alcohols, dioxane, toluene, xylenes, mono- or dichlorobenzene, N,N-dimethylformamide and N-methylpyrrolidone.

The oxidation of the thioether compounds to sulfones can be carried out in various ways, for example with hydrogen peroxide with or without the presence of suitable catalysts, for example tungsten or vanadium compounds, also with peracetic acid, potassium permanganate or chromic acid, or with chlorine/hydrochloric acid, in each case in an aqueous, aqueous-organic or organic medium.

The conversion of the hydroxyethylsulfonyl radical into a suitable reactive radical, for example into a sulfatoethylsulfonyl, thiosulfatoethylsulfonyl, phosphatoethylsulfonyl or vinylsulfonyl radical, is effected in a conventional manner.

The reduction of the nitro groups is likewise effected in a conventional manner, for example by catalytic hydrogenation with Pd/carbon in ethanol, ethyl acetate or tetrahydrofuran at room temperature to about 40° C., or else with Fe/hydrochloric acid or Fe/acetic acid in aqueous solution.

The reaction of the amine with the acid halide is advantageously carried out in an aqueous, aqueous-organic or organic medium at temperatures from 0°-20° C. in the presence of alkaline acid acceptors, for example alkali metal hydroxides, carbonates or bicarbonates. The reduction and acylation steps can if desired be carried out as a one-pot process without intermediate isolation of the amine.

The coupling components of the formula (4) are known or can be obtained by methods known per se.

The reaction of the amines of the formula (3) with the coupling components of the formula (4) to form azo dyes is likewise carded out according to known methods, by diazotizing and coupling.

The dyes of the formula (1) according to the invention are fibre-reactive. Fibre-reactive dyes are to be understood as meaning dyes which are capable of reacting with the hydroxyl groups of the cellulose or with the reactive centres of natural and synthetic polyamides to form covalent chemical bonds.

The dyes of the formula (1) are suitable for dyeing and printing a wide range of fibre materials, in particular textile fibre materials, for example silk, fibre materials made of cellulose and in particular wool, synthetic fibre materials, for example nylon-6 and nylon-6,6, and leather. These materials may be present in a wide range of processing states, for example as yarn, woven fabric, web or knitted fabric. The dyeings obtained are level and have good allround fastness properties, for example light and wet fastness properties.

The amounts in which the dyes of the formula (1) are used in the dyebaths or print pastes can vary within wide limits, according to the desired depth of shade; generally advantageous amounts are from 0.01 to 10% by weight, in particular from 2 to 10% by weight, based on weight of fibre or the print paste.

The compounds of the formula (1) are preferably used for dyeing fibre materials made of natural polyamides, in particular wool. The apparatus used can be the customary dyeing and printing machines, for example for loose fibre, slubbing, hanks, packages, piece goods and carpets.

The aqueous dyebaths may in addition to the reactive dye contain assistants, in particular levelling assistants. The levelling assistants are advantageously used in an amount from 0.3 to 3%, on weight of fibre.

Further assitants which may be present in the dyebaths are mineral acids, such as sulfuric acid, sulfamic acid or phosphoric acid, organic acids, advantageously lower aliphatic carboxylic acids such as formic acid, acetic acid or maleic acid. The acids are used in particular for setting the pH of the liquors used. A pH from 3 to 6 is preferably set with an organic acid, in particular with formic acid or acetic acid.

Preference is given to dyeing at a pH from 4 to 6, in particular from 4.2 to 5.5.

Further possible dyeing liquor assistants include various salts, in particular ammonium salts or alkali metal salts, e.g. ammonium sulfate or sodium sulfate.

The liquor ratio can vary within a wide limit, for example from 1:6 to 1:80, preferably from 1:10 to 1:50.

The dyeing is carried out from an aqueous liquor by the exhaust method, for example at a temperature between 80° and 105° C. or 110° C. if suitable wool preservatives are used, preferably at a temperature of between 98° and 103° C.

The dyeing time is in general from 30 to 90 minutes.

The dyes of the formula (1) have a very high degree of fixation, for example in wool; accordingly there is no need for an alkaline aftertreatment, for example with ammonia to improve the wet fastness properties.

In the examples which follow, parts are by weight. The temperatures are degrees celsius. Parts by weight bear the same relation to pans by volume as the gram to the cubic centimeter.

Preparation of diazo components

EXAMPLE 1

To a solution of 500 parts of 2,4-dinitro-1-chlorobenzene in 590 parts of N,N-dimethylformamide (DMF) are added 217 parts of potassium fluoride and the reaction mixture is stirred at room temperature for 5 hours. Then 350 parts of 2-mercaptoethanol are added dropwise, the internal temperature rising to 60°-65 ° C., and the reaction mixture is subsequently stirred at that temperature for about 15 hours. Starting materials still present are then made to react by adding 34 parts of potassium carbonate. Finally the reaction mixture is allowed to cool down to room temperature, salts are filtered off, and the filtrate is concentrated. The oily crude product is discharged onto water, and a yellow, crystalline precipitate forms. Filtering off with suction, washing and drying leaves 2-[2,4-dinitrophenylsulfanyl]ethanol in almost quantitative yield and high purity.

EXAMPLE 2

To a solution of 140 parts of 2-[2,4-dinitrophenylsulfanyl]ethanol in 1100 parts of methanol is added a suspension of 220 parts of Oxone ® in 150 parts of water and the reaction mixture is refluxed for about 1 hour with stirring. Then 3.5 parts of ammonium heptamolybdate, dissolved in a little water and 30 parts of 30% hydrogen peroxide are added and the reaction mixture is stirred under reflux until the reaction has ended, at which point saturated sodium disulfite solution is added until peroxide is no longer detectable, the mixture is cooled down to 0°–5° C., salts are filtered off and the filtrate is concentrated. The crystals are filtered off with suction, washed and dried, giving 2-[2,4-dinitrophenylsulfonyl]ethanol in good yield.

EXAMPLE 3

105 parts of 2[2,4-dinitrophenylsulfonyl]ethanol are gradually added at 0°–5° C. to 380 parts of sulfuric acid monohydrate and the mixture is stirred at that temperature for 14 hours. The resulting brown solution is then gradually discharged onto a mixture of ice and 20% sodium chloride solution, the result being a yellowish suspension. The precipitate is filtered off and washed initially with 1000 parts of cold 20% sodium chloride solution and then with 200 parts of ice-water. Drying leaves 2-[2,4-dinitrophenylsulfonyl]ethyl hydrogensulfate in very good yield and purity.

EXAMPLE 4

To a suspension of 180 parts of iron in 500 parts of water are added at 80° C. 19 parts of acetic acid, and the mixture is stirred for 5 minutes. It is then cooled down to 60° C. and is gradually admixed with 150 parts of 2-[2,4-dinitrophenylsulfonyl]ethyl hydrogensulfate. After 30 minutes the reaction mixture is cooled down to 0°–5° C. and insolubles are filtered off.

118 parts of α,β-dibromopropionyl chloride are added dropwise to the filtrate at 0°–5° C. with vigorous stirring while the pH of the solution is maintained at about 5 with 2N sodium hydroxide solution. After the reaction has ended, 10% by volume of sodium chloride are added, and the product is then filtered off with suction, washed and dried to leave the compound of the formula

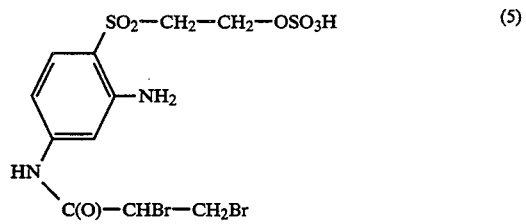

in good yield and purity.

EXAMPLE 4a

The method of Example 4 can be used to prepare the compound of the formula

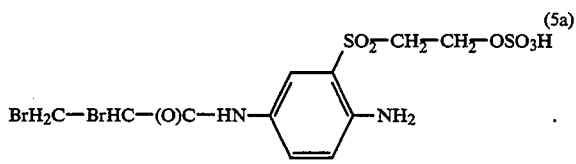

Preparation of the dyes

EXAMPLE 5

10 parts of the compound of the formula (5) of Example 4 are suspended at 0°–5° C. in 60 parts of water and then 13 parts of 1.7M naphthalene-1-sulfonic acid solution and 3.9 parts of 4N sodium nitrite solution are gradually added. After 30 minutes the excess nitrite is destroyed with sulfamic acid. 3.7 parts of 3-methyl-1-(3-sulfophenyl)-5-pyrazoleimine suspended in a little water are added to the diazo solution for coupling at pH 2. After the reaction has ended, the pH is adjusted to 5 and the product is salted out. The product can also be isolated by freeze drying. Filtering off, washing and drying gives the product of the formula

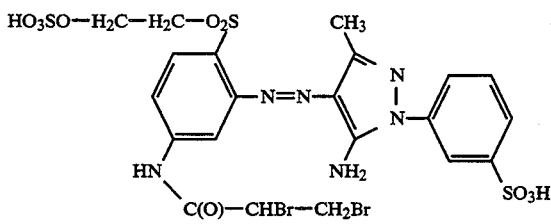

in good yield and purity. The dye dyes wool in a brilliant yellow with high fixation and good wet and light fastness properties.

EXAMPLE 5a

Example 5 is repeated with the compound of the formula (5) replaced by an analogous amount of the compound of the formula (5a), affording the compound of the formula

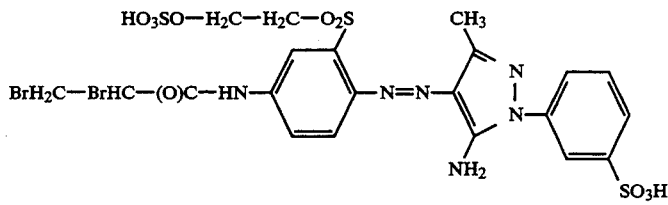

which dyes wool in a brilliant yellow having similar allround fastness properties.

EXAMPLE 5b

Example 5a is repeated using as the coupling component not the 3.7 parts of 3-methyl-1-(3-sulfophenyl)-5-pyrazolimine but the equivalent amount of 1-ethyl-3-sulfomethyl-4-methyl-6-hydroxypyrid-2-one, affording the compound of the formula

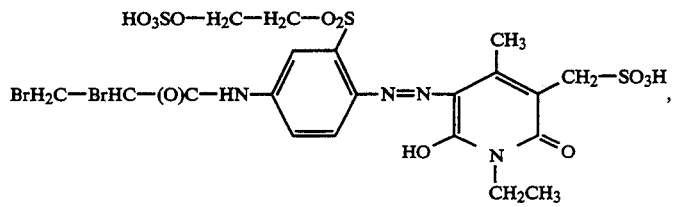

which dyes wool in a yellowish orange shade having similar allround fastness properties.

EXAMPLE 6–29

Example 5 is repeated with the 3-methyl-1-(3-sulfophenyl)-5-pyrazoleimine replaced by the equivalent amount of the coupling components indicated in the table, affording similar dyes which each dye wool with good allround fastness properties.

| Example No. | Coupling component | Hue on wool |
|---|---|---|
| 6 | (structure) | yellow |
| 7 | (structure) | yellow |
| 8 | (structure) | golden yellow |
| 9 | (structure) | orange |
| 10 | (structure) | orange |

-continued
| Example No. | Coupling component | Hue on wool |
|---|---|---|
| 11 | 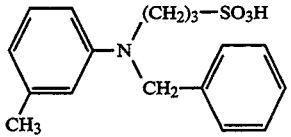 | orange |
| 12 | 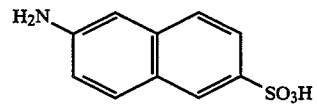 | scarlet |
| 13 | 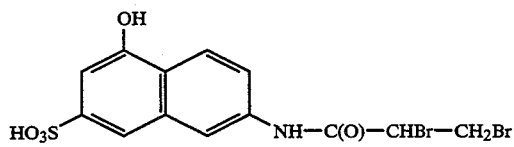 | orange |
| 14 | 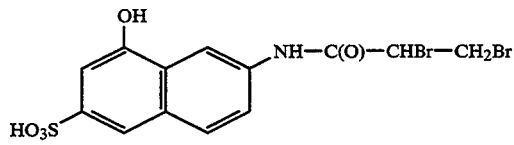 | orange |
| 15 | 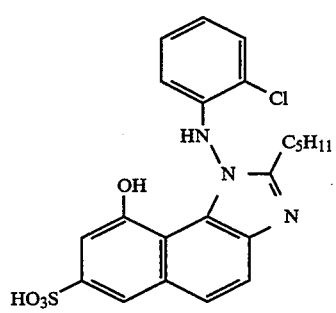 | scarlet |
| 16 | 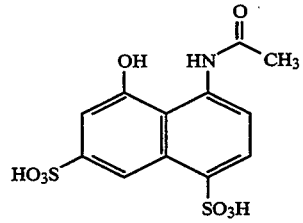 | red |
| 17 | 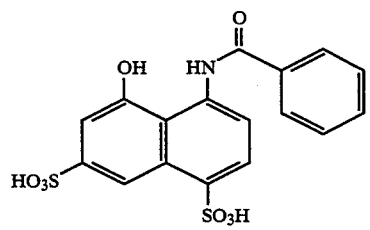 | red |
| 18 | 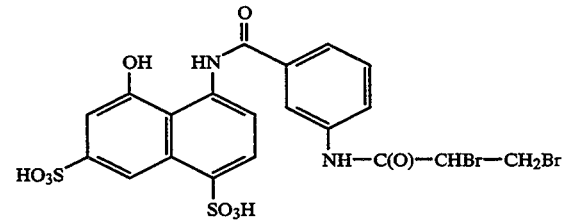 | red |

-continued

| Example No. | Coupling component | Hue on wool |
|---|---|---|
| 19 | 8-hydroxy-1-[(4-(NH-C(O)-CHBr-CH2Br)benzamido)]-naphthalene-3,6-disulfonic acid structure | red |
| 20 | 7-amino-4-hydroxy-naphthalene-2-(N-ethyl-N-(3-sulfophenyl)sulfonamide) | red |
| 21 | 7-amino-4-hydroxy-naphthalene-2-(N-methyl-N-phenyl sulfonamide) | red |
| 22 | 7-amino-4-hydroxy-naphthalene-2-(N-(3-sulfophenyl)sulfonamide) | red |
| 23 | 7-amino-4-hydroxy-naphthalene-2-(N-(2-carboxyphenyl)sulfonamide) | red |
| 24 | 7-amino-4-hydroxy-naphthalene-2-sulfonic acid | red |
| 25 | 7-methylamino-4-hydroxy-naphthalene-2-sulfonic acid | bordeaux |
| 26 | naphthyl-N=N-(4-anilino-8-sulfo-naphthalen-1-yl), with 6 or 7 SO3H on first naphthyl | black |

-continued

| Example No. | Coupling component | Hue on wool |
|---|---|---|
| 27 | 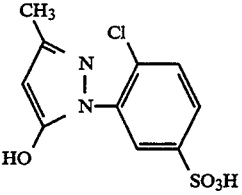 | yellow |
| 28 | 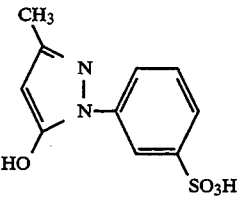 | yellow |
| 29 | 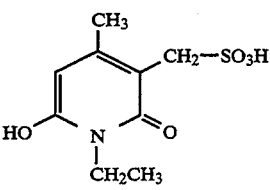 | yellow |

Dye example 0.1 part of the dye of Example 5 is dissolved in 200 parts of demineralized water and 0.5 part of Glauber salt, 0.1 part of a levelling agent and 0.5 part of sodium acetate are added. The pH is then adjusted to 5.5 with 80% acetic acid. The dyebath is heated to 50° C. for 10 minutes and then 10 parts of a wool fabric are added. The temperature is raised to 100° C. over about 50 minutes and held at that level for 60 minutes. The dyebath is then cooled down to 90° C. and the dyeing is removed. The wool fabric is rinsed with hot and cold water, then hydroextracted and dried. The result obtained is a brilliant yellow dyeing which has very good light and wet fastness properties.

What is claimed is:

1. A compound of the formula

where
K is the radical of a benzene, naphthalene, pyrazolone, aminopyrazole, pyridone, pyrimidine, indole, naphthylimidazole, diphenylamine, pyrazolo[2.3-a]pyrimidine, tetrahydroquinoline or acetoacetamide coupling component,
R is a radical —C(O)—C(X)=CH$_2$ or —C-(O)—CH(X)—CH$_2$—X,
X is halogen, and
Z is vinyl or β-sulfatoethyl.

2. A compound according to claim 1, where the coupling component K is unsubstituted or substituted by $C_1$-$C_6$alkyl, $C_1$-$C_4$alkoxy, phenoxy, unsubstituted or hydroxyl-substituted $C_2$-$C_6$alkanoylamino, benzoylamino, amino, N—$C_1$-$C_4$alkyl- or N,N-di-$C_1$-$C_4$alkyl-amino which is unsubstituted or substituted by hydroxyl, $C_1$-$C_4$alkoxy, carboxyl, cyano, halogen, sulfo, sulfato, phenyl or sulfophenyl in the alkyl moiety, cyclohexylamino, N-phenyl- or N—$C_1$-$C_4$alkyl-N-phenyl-amino which is unsubstituted or substituted by $C_1$-$C_4$alkyl, $C_1$-$C_4$alkoxy, halogen or sulfo in the phenyl moiety, $C_2$-$C_4$alkoxycarbonyl, trifluoromethyl, nitro, cyano, halogen, ureido, hydroxyl, carboxyl, sulfo, sulfomethyl, carbamoyl, sulfamoyl, N-phenyl- or N—$C_1$-$C_4$alkyl-N-phenyl-sulfamoyl, which is unsubstituted or substituted by sulfo or carboxyl in the phenyl moiety, methylsulfonyl, a reactive radical —NHR or —NH—C(O)—$C_6H_5$—R, or by unsubstituted or $C_1$-$C_4$alkyl-, $C_1$-$C_4$alkoxy-, halogen-, sulfo-, amino-, N—$C_1$-$C_4$alkyl- or N,N-di-$C_1$-$C_4$alkyl-amino- or phenylamino-substituted phenylazo or naphthylazo.

3. A compound according to claim 1, wherein K is a phenyl or naphthyl radical which carries one or more substitutents selected from the group consisting of hydroxyl, $C_1$-$C_4$alkoxy, amino, N—$C_1$-$C_4$alkyl- or N,N-di-$C_1$-$C_4$alkyl-amino, acetylamino, benzoylamino, $C_1$-$C_4$alkyl, N-phenyl- or N—$C_1$-$C_4$alkyl-N-phenyl-sulfamoyl which is unsubstituted or substituted by carboxyl or sulfo in the phenyl moiety, unsubstituted or sulfo-substituted N—$C_1$-$C_4$alkyl-N-benzylamino, unsubstituted or $C_1$-$C_4$alkyl-, $C_1$-$C_4$alkoxy-, halogen-, sulfo-, amino-, N—$C_1$-$C_4$alkyl- or N,N-di-$C_1$-$C_4$alkyl-amino- or phenylamino-substituted phenylazo or naphthylazo and a reactive radical —NHR or —NH—C-(O)—$C_6H_5$—R; an unsubstituted or $C_1$-$C_4$alkyl-, $C_1$-$C_4$alkoxy-, sulfo- or halogen-substituted 1-phenylpyrazol-5-one or 1-phenyl-5-aminopyrazole radical; an unsubstituted or $C_1$-$C_4$alkyl-, $C_1$-$C_4$alkoxy-, sulfo- or halogen-substituted indole radical; or a naphthylimidazole radical which is unsubstituted or substituted by $C_1$-$C_6$alkyl, sulfo, hydroxyl or phenylamino, which in turn is unsubstituted or substituted by $C_1$-$C_4$alkyl, $C_1$-$C_4$alkoxy, halogen or sulfo.

4. A compound according to claim 1, wherein R is α-bromoacryloyl or α,β-dibromopropionyl.

5. A compound according to claim 1 of the formula (1), wherein K carries one or two sulfo groups and Z is β-sulfatoethyl.

6. A compound according to claim 1 of the formula (1) where

K is the radical of a benzene, naphthalene, pyrazolone, aminopyrazole, pyridone, pyrimidine, indole, naphthylimidazole, diphenylamine, pyrazolo[2.3-a]pyrimidine, tetrahydroquinoline or acetoacetamide coupling component, which is unsubstituted or substituted by $C_1$-$C_6$alkyl, $C_1$-$C_4$alkoxy, phenoxy, unsubstituted or hydroxyl-substituted $C_2$-$C_6$alkanoylamino, benzoylamino, amino, N—$C_1$-$C_4$alkyl- or N,N-di-$C_1$-$C_4$alkyl-amino which is unsubstituted or substituted by hydroxyl, $C_1$-$C_4$alkoxy, carboxyl, cyano, halogen, sulfo, sulfato, phenyl or sulfophenyl in the alkyl moiety, cyclohexylamino, N-phenyl- or N—$C_1$-$C_4$alkyl-N-phenyl-amino which is unsubstituted or substituted by $C_1$-$C_4$alkyl, $C_1$-$C_4$alkoxy, halogen or sulfo in the phenyl moiety, $C_2$-$C_4$alkoxycarbonyl, trifluoromethyl, nitro, cyano, halogen, ureido, hydroxyl, carboxyl, sulfo, sulfomethyl, carbamoyl, sulfamoyl, N-phenyl- or N—$C_1$-$C_4$alkyl-N-phenyl-sulfamoyl, which is unsubstituted or substituted by sulfo or carboxyl in the phenyl moiety, methylsulfonyl, a reactive radical —NHR or —NH—C(O)—$C_6H_5$—R, or by unsubstituted or $C_1$-$C_4$alkyl-, $C_1$-$C_4$alkoxy-, halogen-, sulfo-, amino-, N—$C_1$-$C_4$alkyl- or N,N-di-$C_1$-$C_4$alkyl-amino- or phenylamino-substituted phenylazo or naphthylazo, R is α-chloro- or α-bromo-acryloyl or α,β-dichloro- or α,β-dibromo-propionyl, and Z is vinyl or β-sulfatoethyl.

7. A compound according to claim 1 of the formula (1a) where

K is a phenyl or naphthyl radical which carries one or more substitutents selected from the group consisting of hydroxyl, $C_1$-$C_4$alkoxy, amino, N—$C_1$-$C_4$alkyl- or N,N-di-$C_1$-$C_4$alkyl-amino, acetylamino, benzoylamino, $C_1$-$C_4$alkyl, N-phenyl- or N—$C_1$-$C_4$alkyl-N-phenyl-sulfamoyl which is unsubstituted or substituted by carboxyl or sulfo in the phenyl moiety, unsubstituted or sulfo-substituted N—$C_1$-$C_4$alkyl-N-benzylamino, unsubstituted or $C_1$-$C_4$alkyl-, $C_1$-$C_4$alkoxy-, halogen-, sulfo-, amino-, N—$C_1$-$C_4$alkyl- or N,N-di-$C_1$-$C_4$alkyl-amino- or phenylamino-substituted phenylazo or naphthylazo and a reactive radical —NHR or —NH—C(O)—$C_6H_5$—R; an unsubstituted or $C_1$-$C_4$alkyl-, $C_1$-$C_4$alkoxy-, sulfo- or halogen-substituted 1-phenylpyrazol-5-one or 1-phenyl-5-aminopyrazole radical; an unsubstituted or $C_1$-$C_4$alkyl-, $C_1$-$C_4$alkoxy-, sulfo- or halogen-substituted indole radical; or a naphthylimidazole radical which is unsubstituted or substituted by $C_1$-$C_6$alkyl, sulfo, hydroxyl or phenylamino, which in turn can be substituted by $C_1$-$C_4$alkyl, $C_1$-$C_4$alkoxy, halogen or sulfo, R is α-bromoacryloyl or α,β-dibromopropionyl, and Z is vinyl or β-sulfatoethyl.

8. The process for dyeing or printing hydroxyl-containing or nitrogen-containing fibre material which comprises contacting said material in an aqueous medium with a compound of the formula (1) according to claim 1.

9. The process according to claim 8 for dyeing or printing wool.

* * * * *